G. M. WILLIS.
MEANS FOR OPERATING ELECTROMAGNETS FROM ALTERNATING CURRENT SOURCES.
APPLICATION FILED NOV. 27, 1908.
995,646. Patented June 20, 1911.
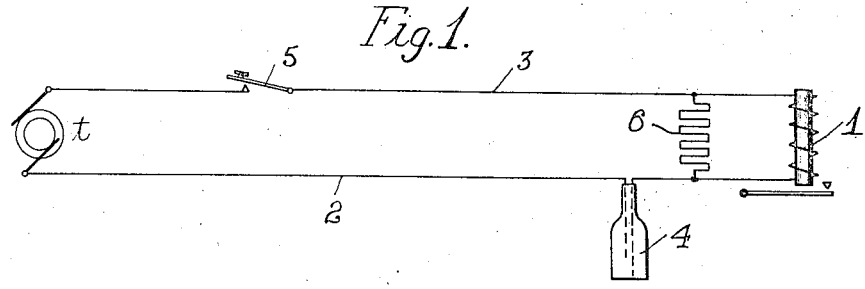
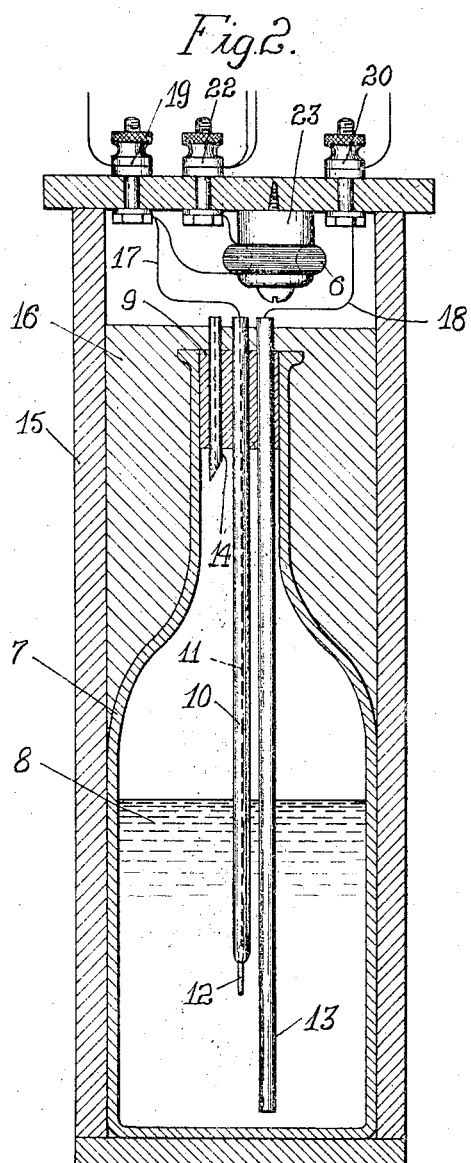
Witnesses
George E. Higham
Frank J. Shelen
Inventor
George M. Willis
By Browne & Williams
Attorneys

UNITED STATES PATENT OFFICE.

GEORGE M. WILLIS, OF CHICAGO, ILLINOIS, ASSIGNOR OF ONE-HALF TO ALFRED STROMBERG, OF CHICAGO, ILLINOIS.

MEANS FOR OPERATING ELECTROMAGNETS FROM ALTERNATING-CURRENT SOURCES.

995,646.  Specification of Letters Patent.  Patented June 20, 1911.

Application filed November 27, 1908. Serial No. 464,547.

*To all whom it may concern:*

Be it known that I, GEORGE M. WILLIS, a citizen of the United States, residing at Chicago, in the county of Cook and State of Illinois, have invented a certain new and useful Improvement in Means for Operating Electromagnets from Alternating-Current Sources, of which the following is a full, clear, concise, and exact description, reference being had to the accompanying drawings, forming a part of this specification.

My invention relates to the operation of electro-magnets and has for its object, improved means for causing effective and efficient operation of electro-magnets when connected with an alternating current source.

It is quite a difficult problem to operate electro-magnets directly on alternating current circuits, as the various electrical and magnetic elements more or less antagonize each other, the results being feeble and unstable magnetic pull. I find that by connecting a current rectifier in the electro-magnet circuit and by bridging a non-inductive resistance about the electromagnet, the magnetic pull becomes as strong, stable and reliable as it would be, were the electromagnet connected with a direct current circuit. I find furthermore, that the non-inductive path is essential to the operation and that without this non-inductive effect there will be no improvement in the electro-magnet pull, even though the current rectifier is in circuit.

In the accompanying drawings which show means for carrying out my invention, Figure 1 is a diagrammatic representation of the circuit arrangement for the electro-magnet and Fig. 2 is a longitudinal cross-sectional view of one form of current rectifier which is adapted to my invention.

In Fig. 1 the electro-magnet 1 to be operated is connected with the limbs 2 and 3, which eventually connect with a source of alternating current as with a generator $t$. In the limb 2 is included a current rectifier device 4, and in the limb 3 is included a circuit controlling switch 5. Between the conductors 2 and 3 and in bridge of the electro-magnet is a non-inductive resistance 6. By closing the switch 5, the current flow through the electromagnet winding, will cause electromagnetic pull to be created which can be utilized for moving an armature suitably connected with mechanism to be controlled.

In Fig. 2 the current rectifier is shown as comprising a vessel or receptacle 7 in the form of a bottle which contains a suitable electrolyte solution 8 which may be in the form of ammonium phosphate. A stopper 9 of insulating material such as rubber, engages in the mouth of the bottle and through said stopper passes a glass tube 10, through which passes a conductor 11, whose lower end is connected with an electrode 12, fused into the glass at the lower end, the conductor being thus protected from the electrolyte. Also extending through the stopper is a bar 13 which forms the other electrode. This bar may be of aluminum and the electrode 12 may be of platinum-iridium although other metals can be used. Also extending through the stopper is a capillary tube 14 which acts as a relief passage upon expansion or contraction within the receptacle and for the escape of gases. The receptacle is inclosed and protected within a case 15 which may be of wood. An insulating filler 16 such as wax is poured into the receptacle about the bottle and to a level above the stopper, the electrode 13 and the glass tubes extending well above the filler so that the conductors 17 and 18 will be protected from any electrolyte which may escape through the tube 14. The lower end of capillary tube 14 is beveled away as shown to prevent drops of electrolyte from adhering in front of the tube opening to be blown out through the tube to attack the external conductors. The conductors 17 and 18 connect with binding posts 19 and 20. Binding post 20 is also connected with one terminal of non-inductive resistance 6 whose other terminal connects with binding post 22. This resistance is shown as wound on a porcelain insulator 23 screwed to the wooden frame. In practice terminal posts 22 and 23 connect with a source of alternating current and binding posts 19 and 22 connect with the electro-magnet to be operated. The electromagnet and non-inductive resistance will then be in parallel relation.

The operation of electrolytic rectifiers like the one just described, is understood by those skilled in the art, current being able to flow to the aluminum electrode but not from said electrode, the theory being that gas bubbles formed on the aluminum will prevent the flow of current from the electrode. By connecting this electrolytic rectifier in an alternating current circuit, the tendency is to suppress the current impulses which will tend to flow from the aluminum electrode and to allow passage of only those which flow toward said electrode. By connecting in circuit with the rectifier only the electromagnet which has considerable self-inductance, I find that the operation of the electromagnet is no better than when connected directly with the alternating current circuit. The exact reasons for this, I have not yet fully determined, but I find that by providing a non-inductive path about the electromagnet, it becomes as strong and as reliable as when the electromagnet is connected with a direct current circuit. Therefore, an electromagnet which is designed to operate say, on a 110-volt direct current circuit can be used with equal effectiveness when connected with a 110-volt alternating current circuit. I even find that while the electromagnet will heat more or less when connected with direct current circuits, it will remain comparatively cool when operated with alternating current circuits.

I believe that the means which I have shown for causing effective operation of an inductive device, such as an electromagnet, when connected with an alternating current circuit, are new and I therefore desire to secure the following claims by Letters Patent:—

1. In a system for operating direct current electromagnets by means of alternating current, the combination of an alternating current source, an electromagnet, line wires extending from such source to the electromagnet, a non-inductive resistance between the terminals of the electromagnet, and a rectifier in one of the line wires, the ohmic resistance of the non-inductive resistance and the reactance of the electromagnet constituting the only impedance connected in circuit with such source through the rectifier.

2. In a system for operating direct current electromagnets by means of alternating current, an electromagnet, a non-inductive resistance connected between the terminals of the electromagnet, an alternating current source, line wires extending from such source, and a rectifier, one line wire extending to one terminal of the rectifier and the other terminal of the rectifier and the other line wire being directly connected with the terminals of the electromagnet.

3. In a system for operating direct current electromagnets by means of alternating current, the combination of an alternating current source, an electromagnet, line wires extending from such source to the electromagnet, a non-inductive resistance between the terminals of the electromagnet, and an electrolytic rectifier in one of the line wires, the ohmic resistance of the non-inductive resistance and the reactance of the electromagnet constituting the only impedance connected in circuit with such source through the rectifier.

4. In a system for operating direct current electromagnets by means of alternating current, an electromagnet, a non-inductive resistance connected between the terminals of the electromagnet, an alternating current source, line wires extending from such source, and an electrolytic rectifier, one line wire extending to one terminal of the rectifier and the other terminal of the rectifier and the other line wire being directly connected with the terminals of the electromagnet.

5. In a system for operating electromagnets by means of alternating current, the combination of an electromagnet, a non-inductive resistance connected around the electromagnet, and an electrolytic rectifier, one terminal of the rectifier being connected with one terminal of the electromagnet and the other terminals of the rectifier and electromagnet adapted to be connected to a source of alternating current.

In witness whereof, I hereunto subscribe my name this 14th day of November A. D. 1908.

GEORGE M. WILLIS.

Witnesses:
CHARLES J. SCHMIDT,
FRANK J. THELEN.